A. MAXWELL.
DUMPING WAGON.
APPLICATION FILED NOV. 9, 1907.

904,793.

Patented Nov. 24, 1908.

2 SHEETS—SHEET 1.

Witnesses

Inventor
Arthur Maxwell,
By
Attorneys

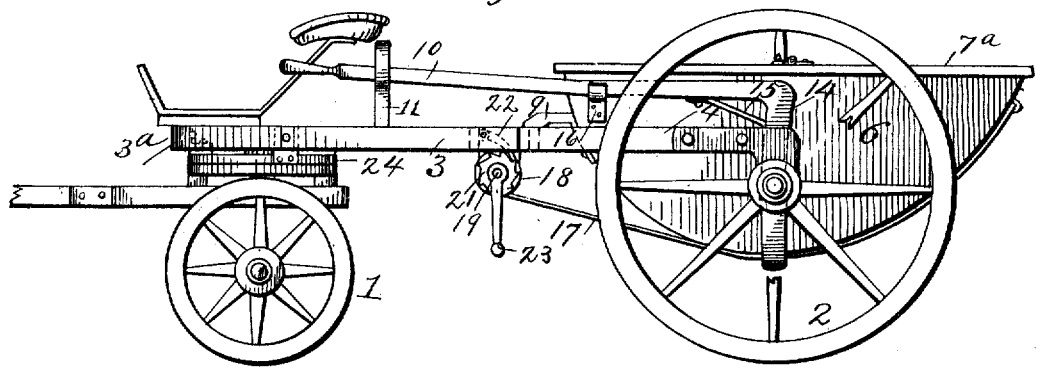
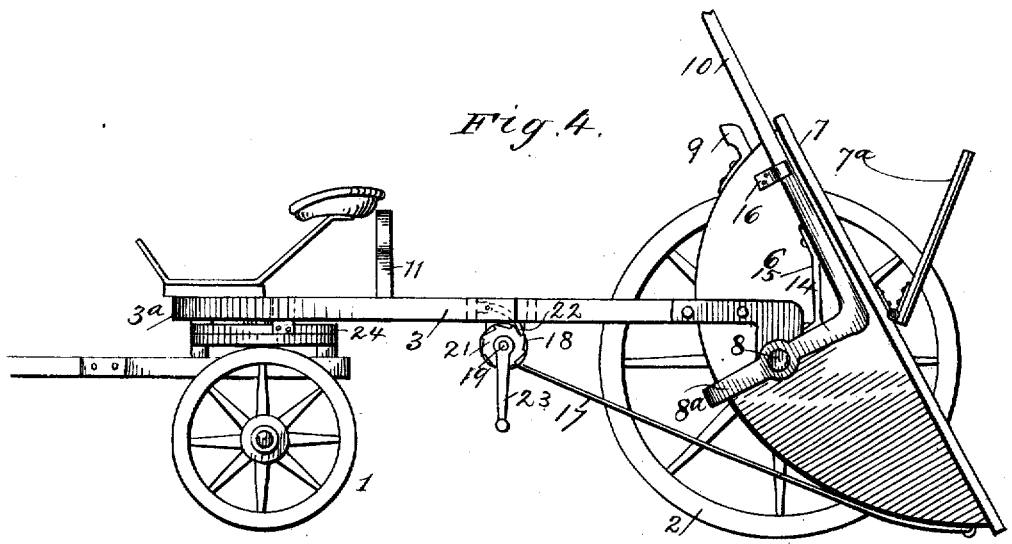
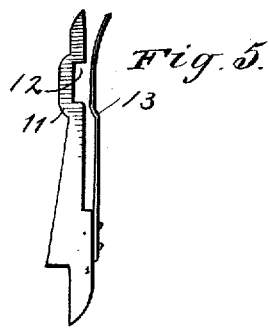

UNITED STATES PATENT OFFICE.

ARTHUR MAXWELL, OF PIQUA, OHIO.

DUMPING-WAGON.

No. 904,793.   Specification of Letters Patent.   Patented Nov. 24, 1908.

Application filed November 9, 1907. Serial No. 401,450.

*To all whom it may concern:*

Be it known that I, ARTHUR MAXWELL, a citizen of the United States, residing at Piqua, in the county of Miami and State of Ohio, have invented certain new and useful Improvements in Dumping-Wagons, of which the following is a specification.

The present invention relates in general to vehicles and more particularly to an improved dumping wagon embodying novel means for mounting the wagon body and for retaining the same either in an upright or a dumping position.

The object of the invention is to provide a wagon of this character which is durable and inexpensive in its construction and is peculiarly designed so as to be readily manipulated by a single operator.

Figure 1:
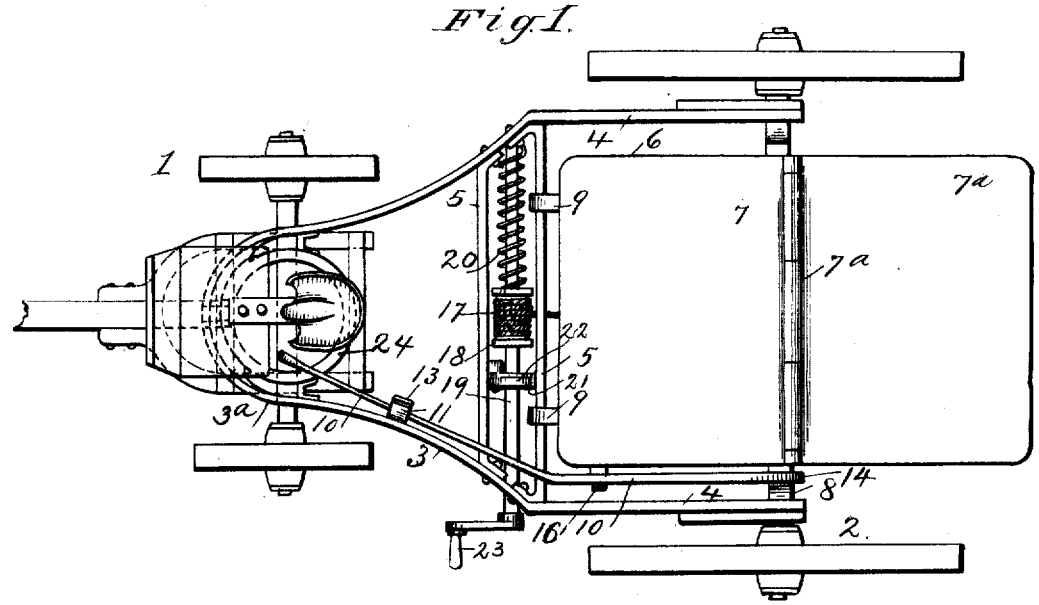
Figure 2:
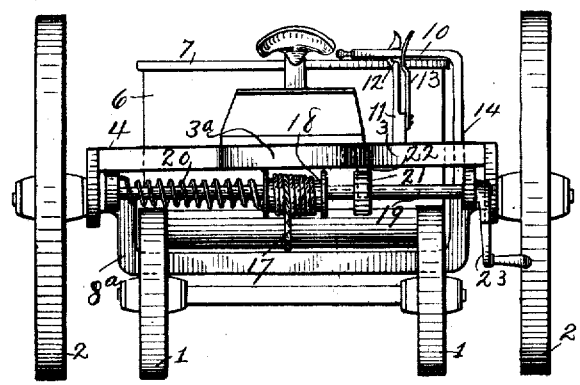

For a full description of the invention and the merits thereof and also to acquire a knowledge of the details of construction and the means for effecting the result, reference is to be had to the following description and accompanying drawings, in which:

Figure 1 is a top plan view of a dumping wagon embodying the invention. Fig. 2 is a front elevation of the same, parts being removed. Fig. 3 is a side elevation showing the wagon body in an upright position. Fig. 4 is a similar view showing the wagon body when dumped. Fig. 5 is an enlarged detail view of the catch for engaging the dumping lever.

Corresponding and like parts are referred to in the following description and indicated in all the views of the drawings by the same reference characters.

The running gear of the wagon comprises the front wheels 1 and the rear wheels 2 supporting a frame 3 of novel construction. This frame is preferably formed entirely of metal and comprises a rearwardly facing U shaped member 3ª, the rear portion of the limbs of which constitute the spaced and parallel side pieces 4. The forward portion of this U shaped member 3ª extends around a plate 24 and is rigidly connected thereto, the said plate being provided with an opening for receiving the king bolt and constituting a portion of the fifth wheel. It will also be observed that the two limbs of the U shaped member 3ª are connected immediately forward of the parallel side pieces 4 by a pair of spaced transverse bars 5 which reinforce the frame in an obvious manner. The wagon body 6 is movably mounted between the side pieces 4 so as to swing about a horizontal axis and is adapted to be swung either forwardly into an upright position or rearwardly into a dumping position. This wagon body 6 may be of any approved form and in the present instance is shown as constructed with a rounded bottom and as provided with a cover 7 comprising a hinged section 7ª. Connecting the side pieces 4 of the vehicle frame is an axle 8 having the rear wheels 2 mounted upon the extremities thereof, the intermediate portion of the axle being given a crank formation as indicated at 8ª and serving as a support for the wagon body 6, the said wagon body being so mounted upon the axle as to be balanced thereon when in an upright position. Extending forwardly from each side of the wagon body 6 is an arm 9 designed to engage the upper face of one of the cross bars 5 when the wagon body is swung into an upright position. A lever 10 which is rigid with the crank portion 8ª of the axle extends forwardly along one side of the wagon body 6 and is designed to engage a catch upon the frame 3, the said catch being constituted by a standard 11 having a notch 12 in one side thereof. It will also be observed that a spring strip 13 projects upwardly along the standard and is designed to bear against the lever 10 and normally retain the same in engagement with the notch. In the present instance the rear end of the lever 10 is secured to an upright bar 14 connected to the crank portion of the axle 8 and a diagonal brace 15 is utilized to insure a rigid joint between the lever and the upright bar. A projection 16 extends laterally from the wagon body 6 and is designed to engage the lever 10 and prevent the dumping of the wagon when the said lever is in engagement with the standard 11. It will thus be apparent that in the normal position of the vehicle body the same is held against swinging movement in one direction by the arms 9 and in the opposite direction by the projection 16 engaging the lever 10. However by disengaging the lever from the standard 11 and swinging the same upwardly the wagon body will be revolved about its axis and caused to assume a dumping position.

For the purpose of retaining the wagon body in a dumping position until the vehicle has been drawn away from the material dumped a cable 17 is utilized which extends around the bottom of the wagon body, one end of the cable being secured directly to the said wagon body while the opposite end is wound upon a drum 18 carried by a transverse shaft 19 journaled upon the frame of the vehicle under the transverse bars 5. A coil spring 20 surrounds a portion of the shaft and normally operates to rotate the drum 18 in such a manner as to wind up the cable 17. One end of the shaft 19 carries a ratchet wheel 21 engaged by a gravity pawl 22, the said pawl and ratchet coöperating to prevent unwinding of the cable 17 from the drum. It will thus be apparent that when the wagon body is swung rearwardly into a dumping position the slack thereby produced in the cable will be automatically wound up by the drum 18 due to the action of the spring 20 and that the pawl 22 will engage the ratchet wheel 21 to prevent subsequent unwinding of the cable. In this manner the wagon body is retained in a dumping position until the vehicle has been drawn away from the material dumped and it is desired to again swing the wagon body into an upright position. The pawl 22 is then disengaged from the ratchet wheel and the lever 10 swung downwardly and caused to engage the notch 12 of the standard, the said lever in its downward movement engaging the projection 16 and causing the wagon body to swing forwardly. Such movement of the wagon body again unwinds the cable 17 from the drum and places the spring 20 under tension. The pawl 22 is then again moved into engagement with the ratchet wheel and the wagon is again ready for use. In the present instance a crank handle 23 is shown as applied to one of the extremities of the shaft 19.

Having thus described the invention, what is claimed as new is:

1. The combination of a running gear, a wagon body pivotally mounted upon the running gear, means for moving the wagon body into a dumping position, a drum mounted upon the running gear, a cable connected to the wagon body and adapted to be wound upon the drum to retain the wagon body in a dumping position, and means for automatically revolving the drum to take up the cable when the wagon is dumped.

2. The combination of a running gear, a wagon body pivotally mounted upon the running gear, means for swinging the wagon body into a dumping position, a drum mounted upon the running gear a cable connected to the wagon body and adapted to be wound upon the drum to hold the wagon body in a dumping position, means for automatically revolving the drum to take up slack from the cable, and a pawl and ratchet mechanism for preventing unwinding of the cable from the drum 3. The combination of a running gear, a wagon body loosely mounted upon the running gear, means for tilting the wagon body into a dumping position, a cable connected to the wagon body, a spring actuated drum for automatically taking up the slack in the cable when the wagon is dumped, and means for preventing unwinding of the cable from the drum.

4. The combination of a running gear comprising a frame and an axle having a crank portion, a wagon body mounted upon the crank portion of the axle, an arm projecting from the wagon body for engaging the frame, a dumping lever rigid with the crank portion of the axle, a projection upon the wagon body for engaging the dumping lever, and means coöperating with the dumping lever to hold the wagon body in an upright position.

5. The combination of a running gear comprising a frame and a crank axle, a wagon body mounted upon the crank portion of the axle, an arm carried by the wagon body for engaging the frame, a dumping lever rigid with the crank portion of the axle, a projection upon the wagon body adapted to engage the dumping lever and to coöperate with the before mentioned arm to retain the wagon body in an upright position, means for locking the dumping lever to the frame, and means for retaining the wagon body in a dumping position.

6. The combination of a running gear comprising a frame and a crank axle, a wagon body mounted upon the crank portion of the axle, an arm projecting from the wagon body, a dumping lever rigid with the crank portion of the axle, a projection upon the wagon body adapted to engage the dumping lever, means for locking the dumping lever to the frame, the said projection and arm coöperating to retain the wagon body in an upright position when the lever is locked to the frame, and a drum and cable mechanism for retaining the wagon body in a dumping position.

In testimony whereof I affix my signature in presence of two witnesses.

ARTHUR MAXWELL. [L. S.]

Witnesses:
CARRIE WAGNER,
LASH O. HARBAUGH.